Oct. 26, 1943.  A. E. HIBSCHMAN ET AL  2,332,573
EXTENSOMETER
Filed Oct. 1, 1941  6 Sheets-Sheet 1
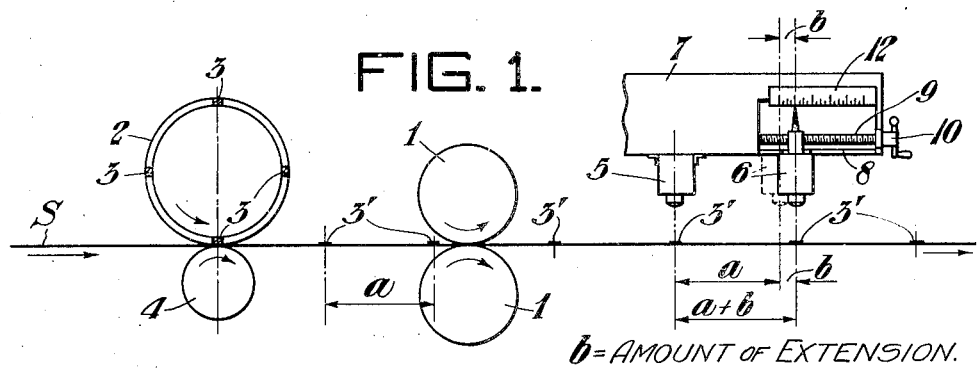
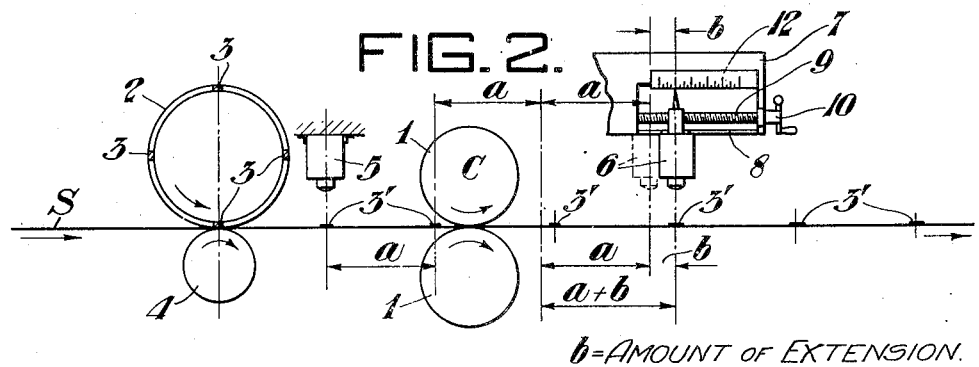
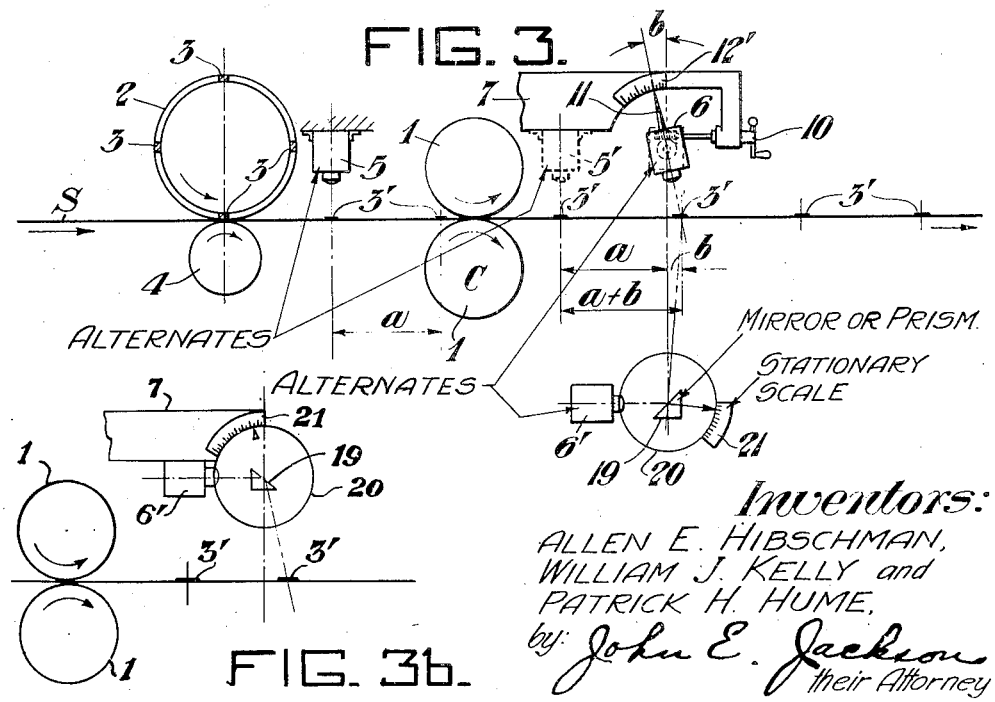
Inventors:
ALLEN E. HIBSCHMAN,
WILLIAM J. KELLY and
PATRICK H. HUME,
by John E. Jackson
their Attorney Oct. 26, 1943.  A. E. HIBSCHMAN ET AL  2,332,573
EXTENSOMETER
Filed Oct. 1, 1941   6 Sheets-Sheet 2
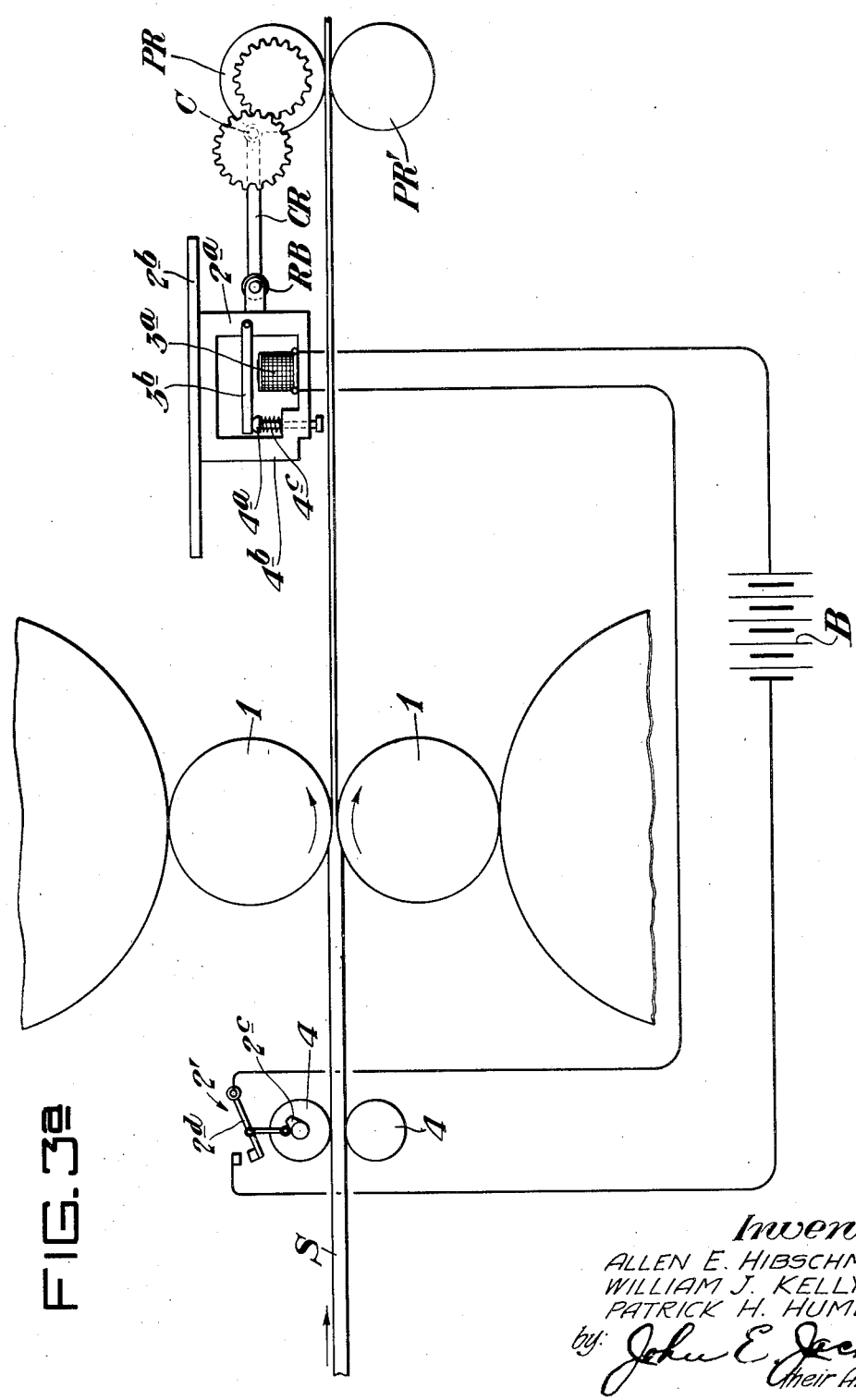
Inventors:
ALLEN E. HIBSCHMAN,
WILLIAM J. KELLY and
PATRICK H. HUME,
by: John E. Jackson
Their Attorney.

Oct. 26, 1943.  A. E. HIBSCHMAN ET AL  2,332,573
EXTENSOMETER
Filed Oct. 1, 1941   6 Sheets-Sheet 4
FIG. 6.
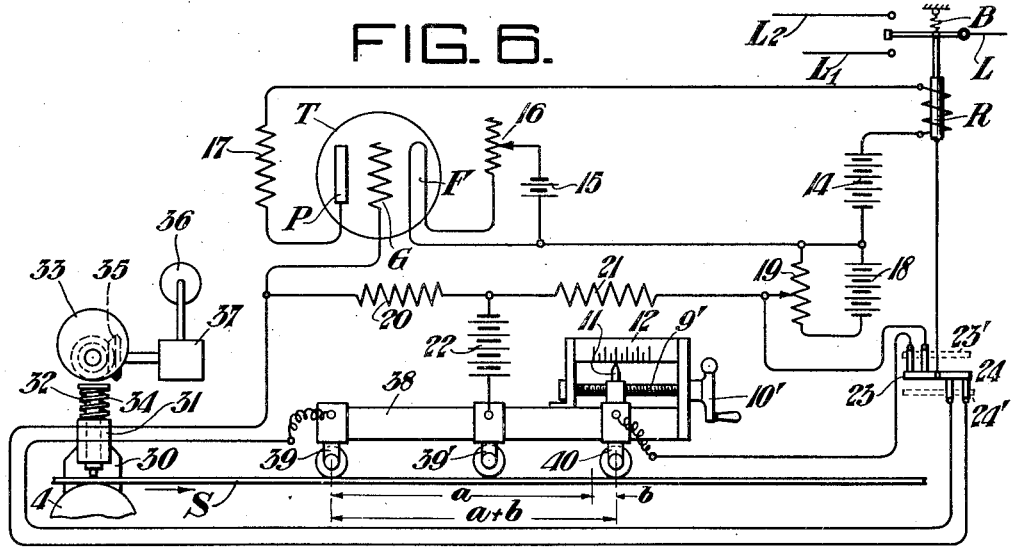
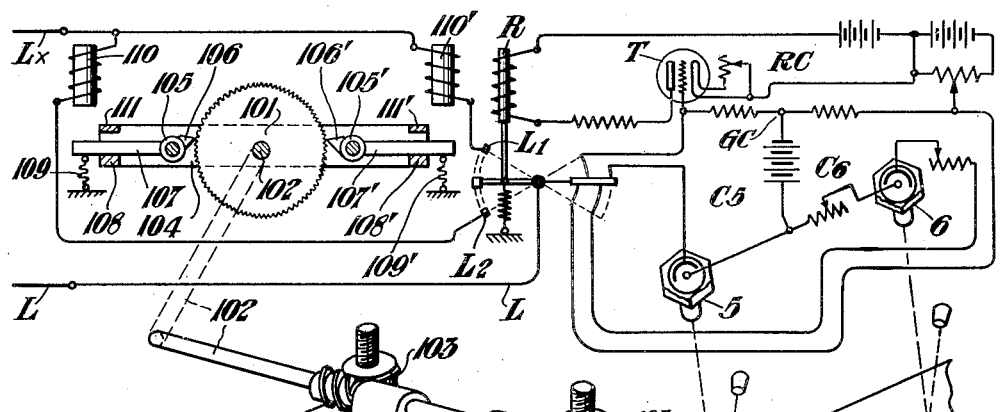
FIG. 10.
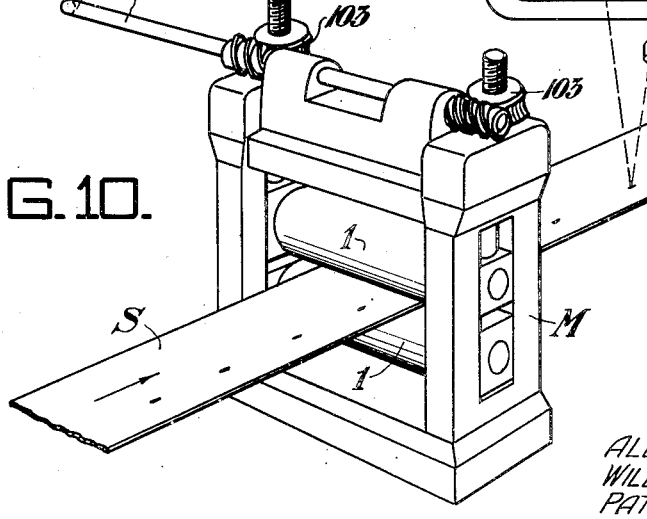
Inventors:
ALLEN E. HIBSCHMAN,
WILLIAM J. KELLY and
PATRICK H. HUME,
by John E. Jackson
their Attorney.

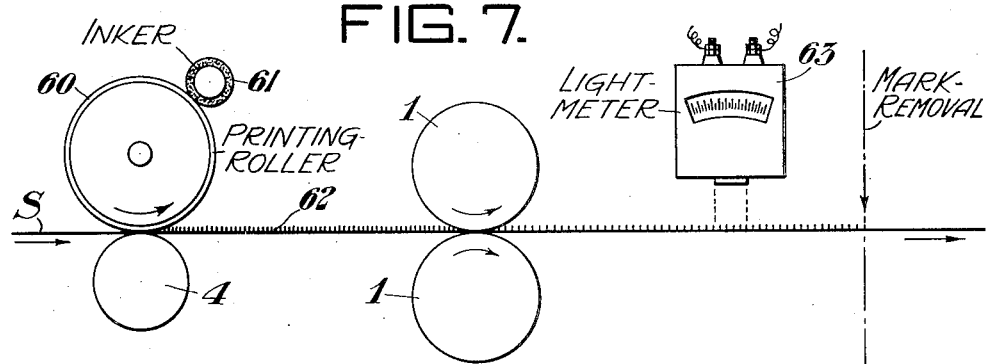
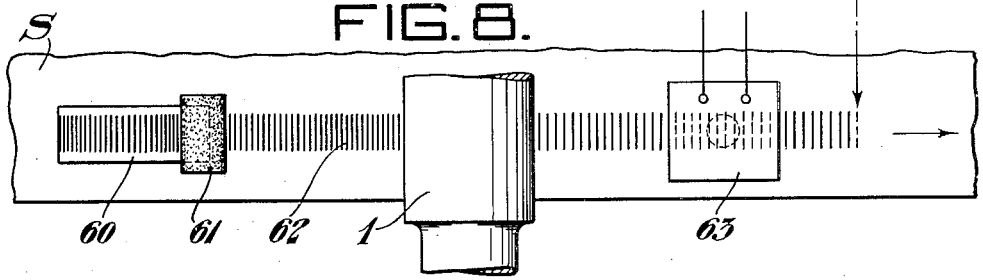
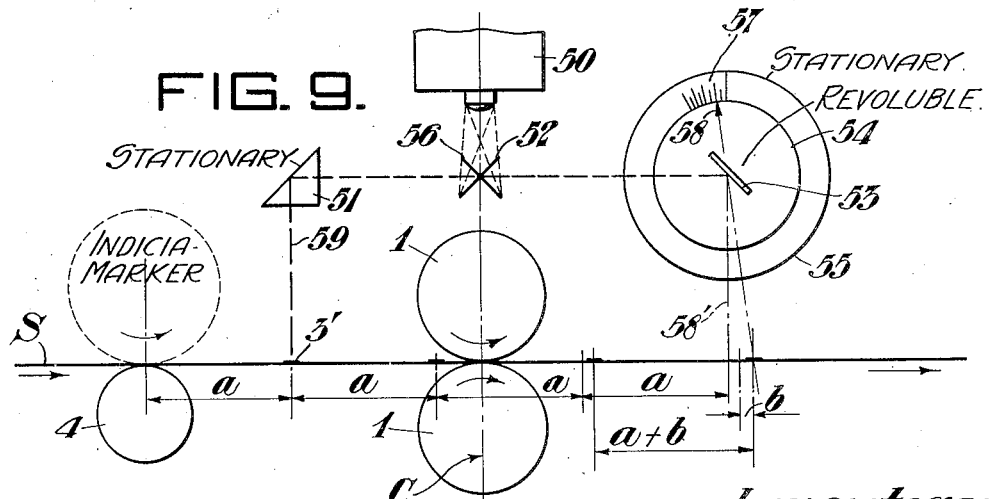

Oct. 26, 1943.  A. E. HIBSCHMAN ET AL  2,332,573

EXTENSOMETER

Filed Oct. 1, 1941  6 Sheets-Sheet 6

Inventors:
ALLEN E. HIBSCHMAN,
WILLIAM J. KELLY and
PATRICK H. HUME,
by: John E. Jackson
their Attorney.

Patented Oct. 26, 1943

2,332,573

UNITED STATES PATENT OFFICE 2,332,573

EXTENSOMETER

Allen E. Hibschman, Cleveland Heights, Ohio, William J. Kelly, Wilkinsburg, Pa., and Patrick H. Hume, Lakewood, Ohio, assignors to Carnegie-Illinois Steel Corporation, a corporation of New Jersey Application October 1, 1941, Serial No. 413,224

19 Claims. (Cl. 80—31.1)

This invention relates to measuring devices, and, more particularly, to such devices that are adapted accurately to determine the actual extension of an elongated body, such as, metallic strips or wire, during the forging thereof, as in a rolling mill.

The invention is directed toward improving contemporary instrumentalities of this kind, which, for the most part, have been based upon thickness gauges, or upon extension measuring devices, using as a basis, the comparison of the speed of the work-piece entering the mill with the speed of a work-piece leaving that mill to give a determination of the rate of elongation. The present device is directed to determining the exact amount of elongation per unit length of work-piece, thus eliminating all comparative factors, and obviating the necessity for mental computation in arriving at the total extension.

It is, therefore, an object of the present invention to determine efficiently, expeditiously, and in a simple manner, the actual elongation being imparted to a work-piece, such as, steel strip, during the reducing operation.

It is a related object to provide such a device which will automatically indicate and/or control the proper setting of the reducing means, such as mill rolls, and/or tensioning devices, to provide the requisite amount of reduction, and will indicate and/or control any departure from such predetermined setting looking toward the manual or automatic restitution of the correct reducing condition.

It is a further object to provide a device of the kind described that will give the exact amount of extension by direct reading without regard to rates, percentages, and without mental computation.

Other objects and advantages will become apparent hereinafter when the following sepcification is read in conjunction with the accompanying drawings, in which:

Figure 1 is a schematic side elevational view of one form of the invention, as applied to a strip rolling mill.

Figures 2 and 3 are illustrations of modified forms of the invention as illustrated in Figure 1.

Figure 3a illustrates a modified arrangement for the establishment of index marks upon the moving strip at the exit side of the mill.

Figure 3b is a modified form of the apparatus shown in Figure 3.

Figure 4:
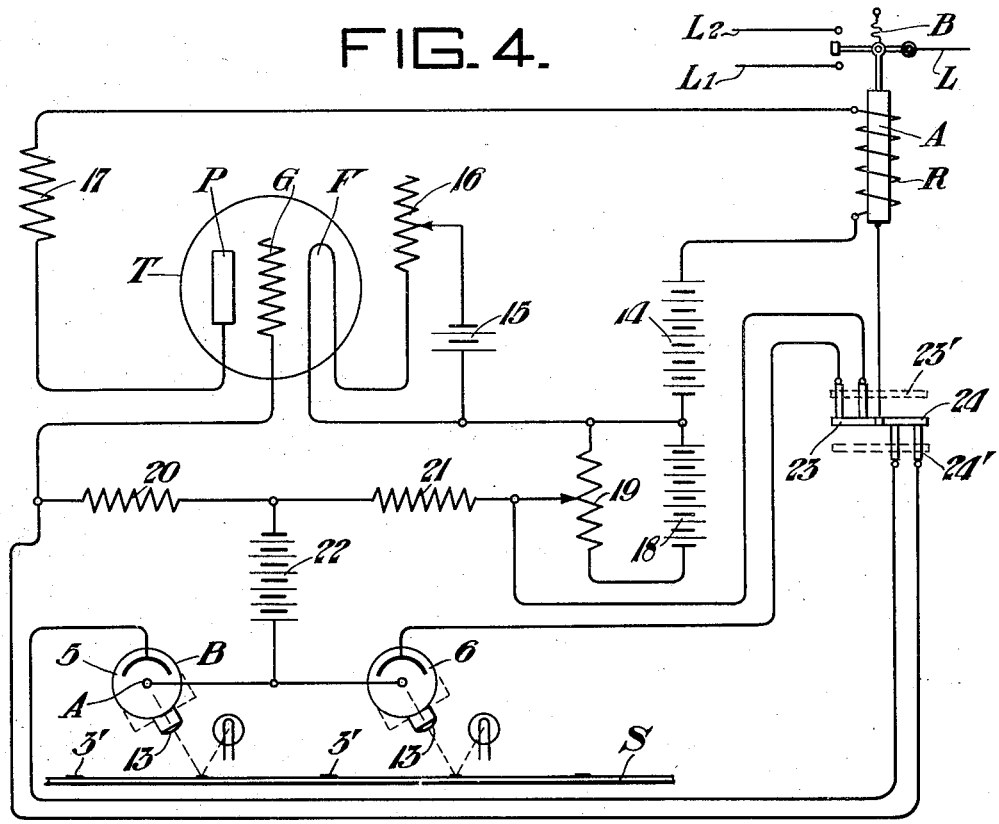

Figure 4 comprises one form of circuit diagram for giving effect to the invention as illustrated in the foregoing figures.

Figure 5:
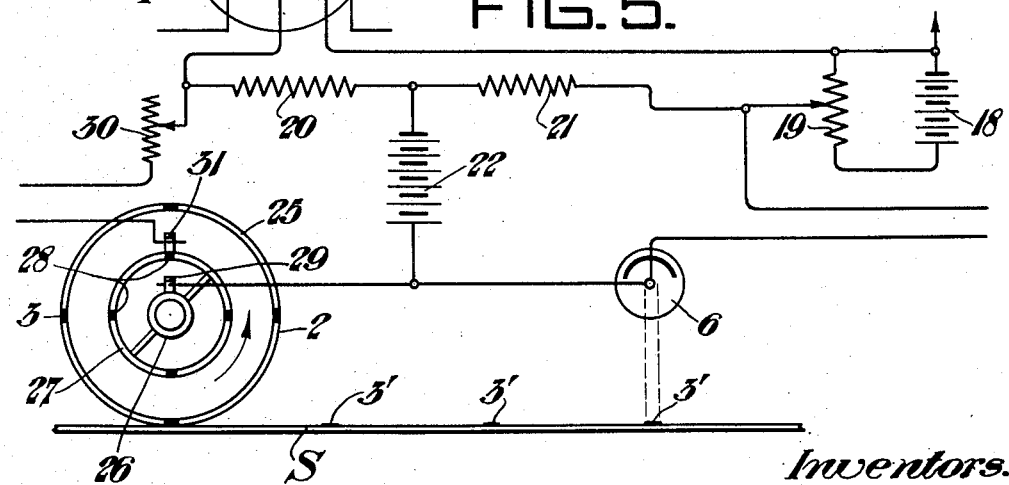

Figure 5 is a diagrammatic representation of a modified form of the invention including a circuit diagram corresponding to that shown in Figure 4 with changes adapted to the modification.

Figure 6 is a modified arrangement embodying the principles of the invention as applied to direct electrical contacts as distinguished from electronic tube means.

Figure 7 is a view corresponding to Figures 1 to 3 showing a further modification of the invention.

Figure 8 is a fragmentary plan view of Figure 7.

Figure 9 is a modification of the invention disclosed in Figure 3.

Figure 10 is a combined diagrammatic and perspective view showing one application of the present invention to the automatic control of a rolling mill screwdown mechanism.

Figure 11:
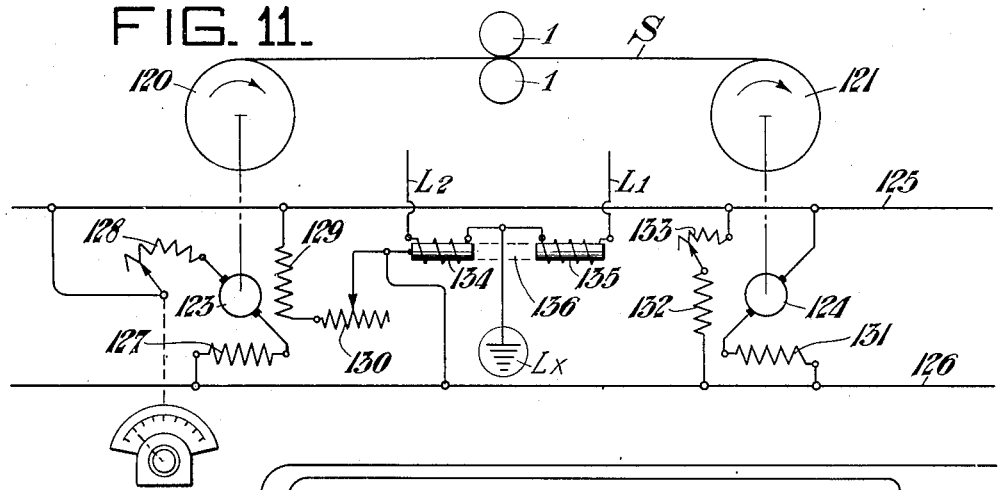

Figure 11 is a diagrammatic view illustrative of how the invention may be applied to control the rolling tension to which strip being reduced is subjected.

Figure 12:
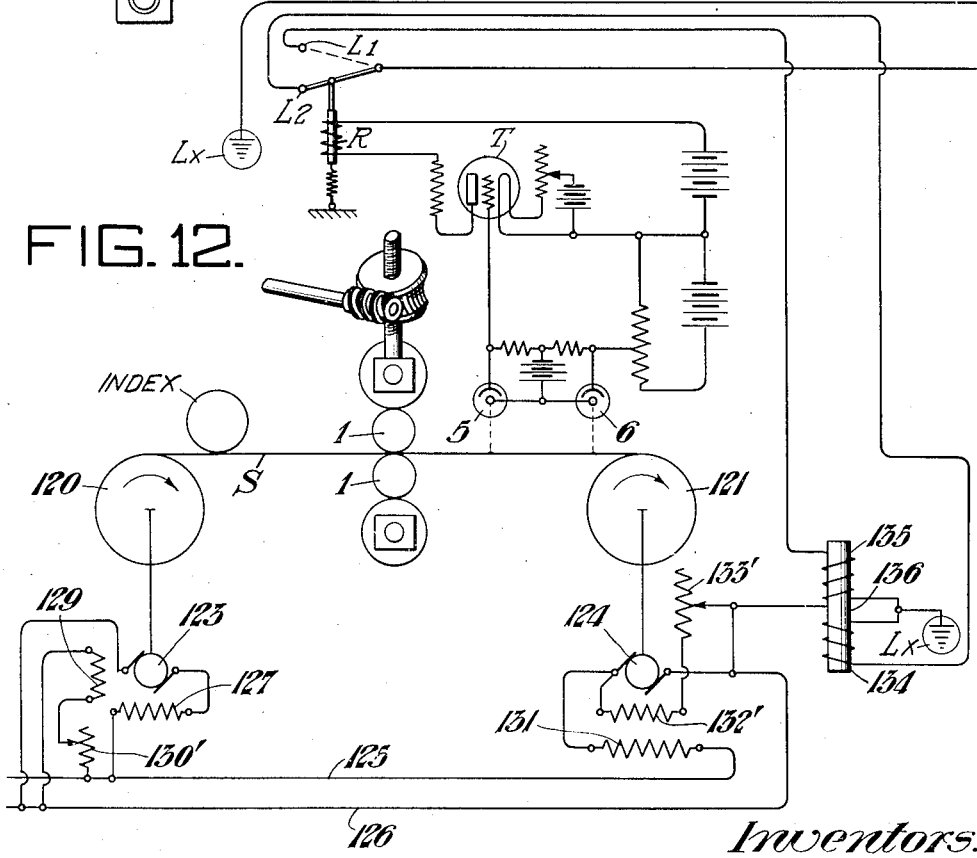

Figure 12 is a diagrammatic view illustrative of how both the screwdown pressure and the working tension to which a strip being rolled is subjected may be automatically controlled by the present invention.

Referring now more particularly to the drawings, in which like reference characters refer to like parts throughout, the work-piece S, which, for purposes of this description may be considered to be steel strip in the process of cold reduction, (although the invention is equally applicable to wire, rods, sheets, or other shapes of any composition whatsoever, whether, hot or cold), is directed to the reducing rolls 1 past an indicia marking device 2, which may take the form of a roller of predetermined circumferential dimension, having one or more index-establishing points 3 upon its periphery. Backing up the strip beneath the indicia marker 2 is an idle roll 4, against which the strip S can be pressed without deflection. The index-establishing points are such as to dispose marks 3' upon the strip as it is moved beneath the marker, which latter rotates without slippage upon the strip so that the peripheral speed thereof exactly equals the rectilinear speed of the strip. The markings 3' are of any suitable composition, such as ink, paint, metal powder, chalk, or other suitable substance, that will not be effaced by the deformation of the metal by the rolls, and which will modify the reflected light emitted by the strip.

The marks 3' are disposed upon the strip at some predetermined, uniform distance $a$, which, when the strip emerges from the rolls after reduction, is increased by the extension in the strip, as, for instance, for some distance $b$, whereby the new dimension between the index markings 3' equals the distance $a$, plus the distance $b$, as indicated.

Suitably mounted over the strip at the exit side of the mill, and arranged so as to scan the strip in the line of the markings 3', is a pair of photoelectric cells 5 and 6, the first of which is positioned to scan the marks 3', from a stationary support 7. The other photoelectric cell 6 is mounted for movement in directions parallel to the longitudinal axis of the strip, as upon slide rods 8, along which it may be propelled by a screw 9, journaled at its ends in suitable bearings provided therefor in the stationary support 7. The screws may be manually operated in either direction by a crank 10, or by a reversing motor provided for this purpose (not shown). The photoelectric cell 6 is equipped with a pointer 11 to indicate upon a stationary scale 12 its point of placement.

The scale is calibrated in terms of units of length, the zero setting of which is obtained when the photoelectric cell 6, and the photoelectric cell 5, scan points on the strip S, $a$ distance apart; i. e., the distance established by the indicia marker between the index markings 3'. When the strip is elongated, the index markings 3' are moved farther apart, so that, for the photoelectric cell 5 and the photoelectric cell 6 to scan adjacent markings simultaneously, the latter cell will have to be moved away from the former cell some distance $b$, equal to the amount of elongation effected in the unit length $a$ of the unreduced strip. The amount of this movement, and the extent of the distance $b$, is indicated upon the fixed scale 12 by the pointer 11.

The device illustrated in Figure 2 works similarly to that previously described, except that the photoelectric cell 5 is arranged to scan the strip before it enters the reducing rolls 1. In this case the scanning axis of the stationary cell 5 is disposed equidistant with the scanning axis of the photoelectric cell 6 from the center of the pass line of the mill indicated at C, when the cell 6 is at zero setting; the distance between the scanning axis of the two cells being some even multiple of the distance $a$ between adjacent index markings 3' before reduction. By this arrangement, measurement is obtainable over a greater unit area of strip than is possible in the embodiment illustrated in Figure 1, thus giving a vernier effect to minimize possible error. When the mill is not effecting any reduction, and with the movable cell 6 at zero setting, the cells will be in position simultaneously to scan proximate index marks 3'. As reduction is commenced, the markings 3' at the exit side of the mill are spaced farther apart, whereby, to maintain the synchronous scanning, the cell 6 has to be moved farther away from the cell 5. The measurement thus taken is equal to the total elongation effected in as many units of length $a$ as extend from the scanning axis of the movable cell to the center line C of the work rolls.

In the embodiment shown in Figure 3, the stationary cell 5 may be mounted as in Figure 2 behind the roll pass, or may be mounted, as shown in broken lines at 5', at the exit side of the roll pass, similar to that shown in Figure 1.

In this case (Figure 3), the movable cell 6 is pivoted for oscillation, so that its scanning axis sweeps through a vertical plane corresponding to that passing through the indexing markers 3'. The cell is provided with a pointer 11 adapted to indicate, upon a fixed scale 12', the angular disposition of the scanning axis of the cell relative to the vertical. The zero reading of the scale 12' is indicated when the scanning axis of the cell 6 is exactly vertical, which thus scans a point on the strip exactly $a$ distance from a point of fixed datum, in this case, the cell 5', or some multiple of the distance $a$ from the center line of C of the rolls, in the case of the cell 5 arranged as explained in Figure 2. As the index markings 3' become farther apart incident to reduction, the scanning axis of the cell 6 has to be turned upon the oscillatory axis of its mounting to intercept the nearest index marking 3' simultaneously as some succeeding mark is scanned by the stationary cell. The amount of this angular departure from the vertical is readable by the indication of the pointer 11 upon the fixed scale 12', which scale is calibrated in terms of units of elongation.

There has been illustrated in Figure 3b a further modification of this same principle, wherein a cell 6' is stationarily mounted to view on a horizontal axis, and a mirror or prism 19 is disposed upon a revoluble frame 20 arranged for cooperation with a vernier scale 21. The operation is the same as previously described, in that the increase in distance of a given index mark 3' relative to some fixed datum point, as determined by the scanning axis of a cell positioned at 5 or 5' (Figure 3), is indicated on the vernier scale 21 in terms of angular departure from the vertical; the function of the cell 6' (Figure 3) being rendered identical with that of the cell 6 through the means of the mirror or prism by which the reflected image of an index mark 3' is transmitted to the cell.

Before embarking upon a discussion of the manner in which the photo-electric cells cooperate in the performance of the measuring and/or control function, the index establishing mechanism, disclosed in Figure 3a, should first be described. This device is designed to place index markings upon the strip at the exit side of the rolling mill, or other reducing means with which it is used. Such an arrangement has the advantage of being able to apply an indexing mark without subjecting it to the action of the reducing means which tends to obliterate it. Similarly, there is always a danger in the rolling of metal strip of causing the work rolls to be undesirably marred by the presence, on the surface of the entering work piece, of any extraneous matter, be this ever so slight. By applying the marks after the work-piece has passed through the reducing means, these difficulties are circumvented. One arrangement for accomplishing this result is shown in Figure 3a. Here is provided, upon the down-stream side of the rolling mill, having work rolls 1—1, a flying mounting comprised of a frame 2a supported upon a stationary slide bearing 2b for reciprocation in directions parallel to the movement of the strip. Carried by the slide mounting is an electro-magnet 3a having an armature 3b pivoted to the frame for oscillation in response to recurrent energization of the magnet. A plunger 4a is disposed in a bearing 4b carried by the sliding frame 2a, which plunger extends from a position beneath the armature 3b downwardly in a vertical direction through the bottom of the frame 2b to a point of termination closely adjacent the strip S. A spring 4c is positioned between the plunger bearing 4b and the head of the plunger so as to position the latter slightly out of contact with the strip, and so as yieldingly to resist the movement of the armature 3b downwardly toward the magnet when the latter is energized. The bottom of the plunger is provided with a marking attachment whereby, when it is brought into engagement with the strip, an impression is made thereon which will vary the reflected light emitted by the strip in a manner previously described. For use in conjunction with the apparatus of Figure 6, the mark disposed by the plunger 4a upon the strip may take the form of some dielectric material for the reasons and purposes to be described fully hereinafter.

The electro-magnet 3a is recurrently energized by a timing device 2' placed before the rolling mill of the Figure 3a. This comprises a pair of pinch rolls 4—4' which are adapted to forcefully grip the strip S between them so as to have the motion of the latter imparted thereto without slippage. One of the pinch rolls is in driving engagement with a cam 2c, the operating period of which is applied recurrently to open and close a switch 2d at uniform intervals of time. In accordance with the timing established by the cam, the circuit of the battery B is continually opened and closed so as to effect a repeated de-energizing and re-energizing of the magnet 3a at regular intervals. Since the periodic opening and closing of the switch 2d is accomplished at intervals determined by the velocity of the strip entering the mill, the plunger is caused to fix an index mark upon the exiting strip at the same interval of time. If the mill is subjecting the strip to no reduction, the distance between centers of such marks will be equal to that unit length of strip at the entering side of the mill required to revolve the cam 2c one operating cycle, thus to effect the opening and closing of the circuit once. If, however, the mill is reducing the strip to smaller gauge, and hence effecting an extension thereof, the distance between centers of the marks will be equal to the unit length of strip, previously mentioned, plus an amount corresponding to the extension imparted thereto, since, in the same unit of time, a greater linear extent of strip passes a given point after reduction than passes a given point before reduction.

In order to insure that the index marks are placed on the strip without smearing, it is preferred that the slide frame 2a be controlled in such manner that, during the periods of energization of the electro-magnet, movement will be imparted to the frame at a rate equal to the velocity of the strip as it leaves the mill. A schematic arrangement for giving effect to this is shown at the right-hand side of Figure 3a, which comprises idle pinch rolls PR—PR' that are adapted to be driven without slippage by the movement of the strip therebetween. One of the pinch rolls PR may be provided with a crank pin C to which is secured a connecting rod CR which, at its other end, is fastened, as at RB, upon a suitable bearing on the slide bearing 2a. From this arrangement, it will be seen that as the pinch rolls PR—PR' are revolved by the motion of the strip, the frame 2a is caused to reciprocate back and forth on the stationary slide bearing 2b, thus providing for the placement of a mark upon the strip when the marking means is keeping pace with the movement of the strip.

The indexing marks, thus established, will thereafter be used in conjunction with the photoelectric cells described in the preceding figures, or may be used with the device shown in Figure 6, as previously mentioned. The operation of the photo-electric cell embodiments in utilizing the index marking applied in this or previously described manners will now be discussed.

The simplest manner of obtaining a signal response to these arrangements would be by connecting the cells in series, whereby they must both be activated simultaneously before an impulse is sent through a signal circuit. This may be a negative action, as where light reflected from the surface of the strip is interrupted by the darker index markings 3' to cause an interruption of current flow in the photoelectric cell circuit 14, thus to cause actuation of the signal circuit through an electronic control relay; or it may be positively acting, as where the index markings 3' give off a greater amount of reflected light to energize the photoelectric cells, and thus to actuate a relay control circuit and its signal. So long as the strip S is undergoing the proper amount of reduction, the signal would continue to act, but as soon as the reduction falls above or below the amount required, the signal circuit would, by virtue of the series connection, become inactive, thus indicating the changed condition. The mill operator would then move the movable cell 6 to and fro by manipulating the crank 10, as is shown in Figure 1, until the direction (whether more or less elongation) of the departure is established. If a greater amount of reduction is being effected than is required, the cell may be returned to its proper setting, and the screwdowns on the mill relieved until the signal again announces that the proper amount of elongation is being had. If the departure from the ideal condition has been toward too little reduction, this fact will be ascertained in similar manner, and after the cell 6 has been reset to indicate the desired amount of reduction, the screwdowns on the mill will be actuated to exert greater compression, until the signal circuit announces the restitution of the desired amount of reduction.

Such a series arrangement, though perhaps suitable where speed and extreme accuracy are not important, is not well adapted to the needs of the modern rolling mill department. The loss of time and material occasioned by the "hunt-and-find" method required by such an arrangement indicates the need for a better method, particularly one that would automatically apply a correction of gauge setting when needed.

One means by which the accurate positioning of the photoelectric cells can be made known, and which is adapted to automatic operations, is shown in Figure 4. Here the cell 5 is considered the stationary cell, and the cell 6 the movable cell. The strip S, provided with the index markings 3', is passed beneath the cells, which are provided with objective lenses 13 having a critical focal point at the sensitive element of their respective cells. The cells are so arranged in relation to an electron tube control circuit generally designated as T to operate a relay R through which the signal or control circuits are operated.

Inasmuch as the frequency with which the index markings pass the photoelectric cells may, by virtue of the closeness of the markings and the high speed operation of the mills, be in the order of from one to several a second, it is desirable to render the control or signal circuit, which is actuated in response to the cells, in such manner that the intermittent condition created by the movement of the index markings past a given point is caused to give a continuous, rather than intermittent, actuation of the electrical device. It will be appreciated that many different arrangements may be adopted which will be effective to give any type of control or signal actuation desired, but in accordance with the best electrical design, it is preferred that the condition which will be maintained during normal operating conditions be accorded continuous or static electric and mechanical conditions in performance of the control or signal function.

One manner of achieving this condition is illustrated in Figure 4 to which reference is again made. The relay circuit, in which are included the relay R and vacuum tube T, previously mentioned, is energized by any suitable source of electric current, for one representation of which appears the battery 14. A sub-circuit, including battery 15 and variable resistance 16, is provided to heat the filament F of the tube T, thus to promote a flow of electrons from the filament to the plate P of this tube. During such flow, the tube T becomes a conductor allowing the passage of current from the battery 14 through the windings of the relay R, thence through a fixed resistance 17 to plate P of the tube T so as to impress a positive potential thereupon. The flow of electrons from the filament to the plate acts as a conductor through the vacuum tube to allow the battery circuit to flow across the tube back to the battery 14.

In order to control the current passed by the tube T, a grid G of the tube is supplied with a negative bias by the battery 18 and associated grid circuit, which includes a potentiometer 19 and bridge resistances 20 and 21. By controlling the extent to which the grid G is biased, a positive control over the amount of current flowing from the battery 14 in the relay circuit can be exercised in such relationship that the higher the negative bias of the grid G, the less the current passed through the circuit of the battery 14, or vice versa.

The control of the grid circuit, including the battery 18, may be effected by a bridge arrangement actuated by the photoelectric tubes 5 and 6 or by any other instrumentalities adapted to give effect to the invention as illustrated herein. Furthering the description of Figure 4, however, the photo tubes 5 and 6 are respectively connected in bridge circuit relationship to the resistances 20 and 21 and a battery 22. In the case of the cell 5, its anode A is connected to the positive terminal of the battery 22 and its cathode B is connected through a switch 23 and resistance 20 to the negative terminal of the battery 22. In the arrangement of cell 5, therefore, in the presence of sufficient light to induce the electrons to flow in this cell, current will pass from the battery 22 in a clockwise direction through resistance 20 back to the battery 22 so long as switch 23 is maintained in closed circuit position.

The cell 6 stands in same relation to the battery 22, resistance 21, and switch 23' as explained in the case of the cell 5, except the current in the cell 6 circuit may be said to flow in a counterclockwise direction. As is usual in bridge circuits of this kind, so long as cells 5 and 6 are excited by light of the same intensity, current flows in the two cell circuits so as to be equal and opposite in effect relative to each other, thus being self-canceling and effecting no change upon the current of the grid circuit supplied by the battery 18, and causing no alteration of the negative bias of the grid G provided by battery 18 through the potentiometer 19 and the bridge resistances 20 and 21, respectively.

Let it be assumed, however, that the cell 5 is rendered inoperative by virtue of a deficiency of light, its associated circuit is rendered inoperative, leaving the circuit of the cell 6 active to augment the flow of current in the grid circuit so as to increase the negative bias of the grid G, thus to diminish the flow of electrons in tube T and to reduce the flow of current in the relay circuit R from the battery 14. If the cell 5 were assumably left to operate under optimum light conditions and cell 6 were to be rendered inoperative due to insufficient light, the opposite effect on the grid G would be realized in that the current flowing in the cell circuit 6 would stand in opposing relation to the current of the grid circuit G provided by the battery 18, thus causing a diminution of the latter and effecting a reduction of the negative bias G. This, in turn, would allow a greater flow of electrons between the filament and plate of the tube T, rendering the tube of greater conductive capacity, and causing more current to flow in the relay circuit of the battery 14 so as to cause the relay to respond accordingly.

If applied to the present invention, it may be assumed that the index marks placed upon the strip are of light absorptive character appreciably to lower the reflected light emitted by the strip S. So long as the mill is effecting the proper reduction and the cells 5 and 6 are set to respond to this condition in accordance with the description already set forth herein, then, each of the cells will be effected simultaneously by corresponding conditions of light and darkness as these index marks 3' move past the two cells in succession, and are respectively intercepted by the latter simultaneously. Thus, the associated cell circuits in bridge relation, are actuated from the conditions of minimum flow of current, as the index markings induce moments of darkness in each cell, to conditions of maximum current, when the full light reflective value of the strip is received thereby. Whether the condition of maximum or minimum current is being established at any given time, such condition is realized equally and oppositely in the two cell circuits, thus canceling each other, and leaving the over-all electrical effect of the grid circuit G across the resistances 20 and 21 neutral or undisturbed.

Let it be assumed that because of some extraneous influence, the mill conditions get out of adjustment to cause the strip being rolled to elongate too much so as to increase the distance between the index markings 3' for the setting of the cells 5 and 6. Under this condition, an index mark 3' will move within the scanning range of the cell 6 (assuming the strip is moving from left to right in Figure 4) to darken the cell before a following mark intercepts the scanning axis of the cell 5, thus permitting the latter to resume its normal operation as that of the cell circuit 6 becomes relatively inactive. This causes the current flowing through the circuit of cell 5 to be applied in opposition to the current of the grid circuit flowing from the battery 18, through the potentiometer 19, and across the line containing the resistances 20 and 21, to the grid G, so as to lower the negative bias of the latter. This action results in an augmented flow of electrons in the tube T increasing its conductive capacity for the current of battery 14, thus increasing the electrical energy of the windings of the relay R to cause the armature A of the latter to move to a lower position against the resistance of a spring B, which is selected to exert a force against the armature equal to, and balanced by, the electrical force of the relay when energized by the normal flow of current obtained when the bias of the grid G is unaffected by the electrical conditions of the cell circuits.

In the assumed example, where the strip is being elongated too much, the relay is caused to connect one lead of a power line L to the lower contact of lead $L_1$ in accordance with the explanation given above. Simultaneously with the downward movement of the armature A, a contactor bar 24, which is normally held in neutral position by the armature to maintain both cell circuits closed, moves downwardly to dotted line position 24' where it retains the circuit of cell 5 in closed condition, and moves out of contact with the contacts 23 of the circuit of cell 6, thus, for the time being, perpetuating the inoperative status of the latter. It will be observed that this condition will be maintained until the next successive index mark 3' which, under the conditions assumed, will not have come within the scanning range of the cell 5 during the operations described above, moves into position to cause a darkening of the cell 5 and a corresponding cessation of actuation of the associated circuit. This renders the circuit of cell 5 inoperative to correspond to the condition existent in the circuit of cell 6, so that the relation of balance of the two is again restored and the effect of the current flowing in the circuit of cell 5 is removed from the grid circuit allowing the bias of the latter to return to normal. As this is accomplished, the flow in the circuit in battery 14 is lessened whereby the armature A of the relay R is caused, by the tension of spring B, to reassume the neutral position, thus opening the line between contacts L and $L_1$.

Let it now be assumed that the mill by some extraneous influence fails to elongate the strip S sufficiently, causing index markings 3' to fall closer together. The resulting sequence is just opposite of that previously described in that, under these newly assumed conditions, cell 5 is first darkened by the movement of a mark 3' thereunder before a preceding mark has moved into the effective scanning range of cell 6, thus leaving the latter circuit active to augment the current of the battery 18 and the grid circuit G, and to raise the negative bias of the latter to cause the flow of electrons in the tube T to be diminished with an accompanying diminution of flow of current in the relay circuit of the battery 14. This causes the windings of the relay R to be relatively de-energized whereby the armature A is raised from neutral position by the tension of the spring B, which is now no longer balanced by the electrical energy of the relay R. This causes contact to be established between one side of a power lead L and the lead $L_2$ of the upper contacts shown in Figure 4 causing a corresponding energization of associated control or signal circuit of which the lead $L_2$ is a part.

As previously described, when the armature is raised in this manner, the contactor bar 24 is raised out of contact with the contacts 23' of the cell circuit 5, opening the latter, and, for the time being, fixing its status of inactivity. Coincidentally, however, contacts 23 of the associated cell 6 circuit remain closed, to allow the resumption of the flow of current in that circuit in augmentation of that flowing in the grid circuit. This condition is maintained until the delayed index mark 3' comes beneath the cell 6 to darken it, thus causing its associated circuit to become inoperative to restore the conditions of neutral bias on the grid G. This results in the resumption of normal conditions in the relay circuit, including the restoration of sufficient electrical energy in the relay R to cause its return to neutral position against the tension of spring B midway between positions of contacts with the leads $L_1$ and $L_2$.

From the foregoing, it will be appreciated that with the cells set in predetermined position to respond to the proper amount of reduction, and with the proper amount of reduction being effected by the mill, the result is such as to preserve the status quo in the associated circuits, and to provide no actuation of the associated signal or control circuits. If the reduction being effected should become excessive, the relay is actuated to close circuit between the lead L and the lead $L_1$ so as to set into motion corrective operations to restore the gauge setting, or so as to actuate a signal indicative of the improper operating condition, including the direction of departure (too much reduction). If, from the condition of status quo, the condition of too little reduction should become established, the relay is actuated to close the line between lead L and lead $L_2$ which can energize a circuit automatically to correct the departure from gauge, or actuate a signal device to indicate the improper condition and direction of departure (too little reduction).

It is necessary to provide for the interruption of the inactive cell circuit, when an improper amount of reduction is being effected, by the switches 23, 23' and contactor bar 24. If this were not done, the out-of-phase relation caused by the index markings being improperly spaced for the setting of the cells, would cause the cell first to be rendered inactive to be restored to activity after second cell became darkened. This would cause the entire system to be actuated oppositely to that induced by the cell first to respond to the improper gauge conditions. This would mean that the relay would first be caused to operate to close the circuit between the lead L and the lead $L_1$, instantly to go to the opposite extreme to close the circuit of lead $L_2$, or vice versa. It would actuate the over-gauge and under-gauge signals in such rapid succession as to leave in doubt the direction of departure from gauge, or would cause any corrective controls, associated with the circuits of which the leads $L_1$ and $L_2$ are respectively a part, first to actuate to correct the improper setting—then, immediately to respond in the reverse direction, whereby to undo the correction and restore the improper condition. This trouble is circumvented by the double throw double pole switch represented by contacts 23, 23' and contactor bar 24, whose operation has been explained above.

In the embodiment shown in Figure 5, the relay circuit has been omitted and the tube T has been but partially shown, but it will be understood that the circuit may be, for all intents and purposes, identical with that previously described in connection with Figure 4, as is evidenced by the fact that like reference symbols have been applied to the corresponding parts. In this case, however, the cell 6 is balanced, not by a cell 5, but by a commutator device 25 which is associated with the indicia marker 2 described in Figures 1 to 3. Associated with the marker 2, so as to revolve therewith, is a contactor ring 26 which is electrically connected to a concentric ring 27. The latter ring has insulative portions 28 disposed in relation to the radii of the wheel so as to correspond with the index establishing points 3 upon the periphery of the indicia marker 2. The anode lead of the bridge circuit is attached electrically to the contactor ring 26 by a brush contact 29. The opposite side of the circuit is brought from the battery 22 through the resistance 20 and a variable resistance 30 to a brush contactor 31.

According to this arrangement, if the indicia marker 2 is revolved to move index establishing points 3 against the strip S so as to lay down index markings 3' as previously described, the contactor ring 27 is revolved to move an insulator 28 beneath the brush contact 31 so as to effect momentary interruption of that part of the bridge circuit including the commutator 25 and the resistance 20. If this is accomplished by a simultaneous darkening of the cell 6 by the scanning of a foregone indicia mark 3', no unbalanced effect is obtained across the grid circuit extending from the battery 18, through potentiometer 19, and resistances 20 and 21, to the grid G. Similarly, when the cell 6 is rendered electrically active by its interception of the reflected light of the strip, the indicia marker is in that cycle of its revolution wherein no index marks are being established upon the strip and wherein the brush contact 31 is out of engagement with the insulators 28 and in electrically closed-circuit relation, through the rings 26, 27 and associated circuit, with the battery 22. The resistance 30 is rendered variable whereby the conditions of direct contact of the commutator 25 can be adjusted to be electrically equal to the cell 6, so that, when both the commutator circuit and the cell circuit are passing current, the electrical effect across the resistances 20 and 21 is equal and opposite, as previously explained in conjunction with Figure 4. In this embodiment, the indicia marker and contactor must be disposed to engage the strip at the entry side of the reducing rolls, while the cell 6 is, of course, positioned to scan the strip as it emerges from the reducing rolls.

When the mill is open and no reduction is being effected, the zero setting of the cell 6 is determined by that position when the cell 6 intercepts a mark 3' simultaneously with the establishment of a succeeding mark by the marker 2, and the attendant opening of the commutator circuit by the interposition of an insulator 28 between the brush contact 31 and the contactor ring 27. After the mill rolls are screwed down to impart the proper reduction to the strip, the markings 3' become spaced a corresponding amount, requiring that the cell 6 be moved away from the reducing rolls for the simultaneous apprehension of a mark and the establishment of a mark by the commutator-marker device. Any departure from gauge will either cause the commutator circuit to be closed before the apprehension of a mark by cell 6, or will cause the latter to apprehend a mark before the commutator circuit is opened. In either case, the resulting effect upon the bias of grid G and its control of the relay R, as explained in Figure 4, follows as a direct result.

The embodiment illustrated in Figure 6 dispenses with the need of photoelectric cells, but otherwise is closely analogous in operation to the devices hereinbefore described. In this case, however, the index markings are preferably of some dielectric material that will not be unduly disturbed or displaced by the action of the strip passing through the rolls. The marking device, herein adopted for illustrative purposes in Figure 6, may be of the roller type employed to illustrate the principles of the invention in Figures 1 to 4, previously described. However, to make proper disclosure of reasonable alternates, the marker, as shown in Figure 6, comprises a mounting 30 carrying a slide bearing 31 in which a plunger 32 is adapted to be reciprocated by the action of a cam 33 against the opposite force of a compression spring 34. Drive may be imparted to the cam 33, by suitable gearing and shafting 35, from a motor 36, and suitable reduction gearing 37. The lower end of the plunger 32 is provided with suitable marking instrumentalities; such, for instance, as an outlet valve, actuated upon the depressing of the plunger 32 into engagement with the strip's surface, to release a small amount of molten dielectric material, such as, as wax, or synthetic resin of high melting point, from a reservoir thereof provided for the purpose. Even paraffin has been tested successfully, since notwithstanding the relatively high temperature encountered in the roll pass, the paraffin is present in such small amounts that, even though it melts, it has not sufficient mass to run or dissipate to any appreciable extent, and only a minute amount is required to disrupt the low voltage circuits as here are contemplated. However, there are many other plastics, both synthetic and natural, that are suitable for this purpose, which need not melt or dissipate. A powder of fairly high dielectric properties may likewise be employed.

The marker here described may be placed at the exit side of the work rolls in a manner similar to that shown in Figure 3a so long as the reciprocation of the plunger is related in its operating period to the rate of movement of the strip as it enters the mill. This may be done as in Figure 3a or in any of a number of suitable ways that would become apparent to one skilled in the art. Irrespective of whether the marking is placed before or after the roll pass in accordance with these alternatives, the following constitutes a recitation of some of the operating principles which should, as a matter of preference, be followed.

The object is to reciprocate the plunger at periodic intervals to give uniformly spaced index marks upon the strip. To accomplish the placement of the index marks at a point, and to prevent their spreading over a considerable distance, it is preferable to have the mounting 30 for the indicia marking device move in concert with the strip during the interval when the point of the plunger 32 is in engagement therewith, and to return to starting position after the plunger has been withdrawn from the surface of the strip. This may be accomplished by any of the well-known devices applied for similar purposes, as in the art of flying shears, etc: In this case, the backing up roll 4 will be carried by the moving mounting so as to be beneath the plunger 32 at the instant it is actuated.

Upon the exit side of the roll pass, there is provided some suitable stationary mounting 38, depending from which there is a pair of stationary roller contacts 39 and 39', disposed in line of the index markings 3'. A movable contact 40 is arranged to slide upon some suitable mounting, such as the stationary support 38, along which it can be moved by a screw 9', and crank 10'. The slide is provided with a pointer 11 arranged to read upon a fixed scale 12, as in the previously explained embodiments.

In order to prevent rapid intermittent actuation of signal device, as previously stated, it is desirable to adapt the bridge control-vacuum tube and relay circuit to this mechanical equivalent in the same manner as it is applied to the photoelectric cells, it being understood, of course, that should the intermittent actuation be considered suitable, a much simpler circuit could be applied. As shown, however, the circuit corresponds with that previously discussed in Figures 4 and 5, and includes all of the elements, as is indicated by the same reference characters, except for the application of the bridge circuit to the mechanical electrical contact means illustrated. The bridge battery 22 is connected through the contact 39' so as to ground upon the strip S which is thus placed in circuit. The stationary contact 39 carries one side of the bridge circuit through the resistance 20, and, thus, corresponds in position to the stationary cell 5. The movable contact 40 is similarly connected in the other side of the bridge circuit including the resistance 21, thus, corresponding in placement and function to the movable photoelectric cell 6 explained in the previous embodiments. The contacts 39 and 40 are adjusted relative to each other so as simultaneously to be isolated from electrical contact with the strip S by proximate markings 3' which, in this case, are of insulating or dielectric material. So long as this relationship is maintained, the effect of the intermittent current of the bridge circuits on the bias of the grid of tube T, being as they are equal and opposite to each other, is neutralized, thus, leaving the relay circuit energized only to attain inactivity of the relay R, effecting dead center open position of the associated switch involving the leads L, L₁ and L₂. As soon as such an off-gauge condition becomes manifest, either the contact 39 or the contact 40 is engaged by one of the markings 3' before the other, bringing about an unbalanced condition of the associated bridge circuit, as previously explained, so as to vary the bias of the grid of tube T, and to effect actuation of the relay R accordingly. In this embodiment, in order to prevent the possibility of simultaneous interception of the markings 3' by the middle contactor 39', such contactor may be placed out of line with the markings so as always to be in positive ground relationship with the strip S.

When the work is not being reduced, the contacts 39 and 40 will contact the strip a distance equal to the distance $a$ apart, which is that distance between the index marks 3' before the strip enters the mill. After the strip is reduced, the index marks are farther apart upon the exit side of the mill, and this necessitates the movement of the slide contact 40 away from the stationary contact 39 some distance $b$, representative of the amount of reduction, where simultaneous apprehension of adjacent index marks by the contacts 39 and 40 is again realized. The extent to which the movable contact 40 was moved away from the stationary contact 39 will be indicated by the pointer 11 upon the fixed scale 12, which is calibrated in units of length.

The embodiments shown in Figure 9 accomplishes, by the use of one photoelectric cell, that which is accomplished by two cells in the Figure 3 embodiment of the invention. In this case the cell 50 is suitably disposed in some central location with respect to the work rolls of the mill. The prism or mirror 51 is disposed upon the approach side of the mill to reflect the image of the index marks 3' as they pass therebeneath, over to a mirror or prism 52, which is disposed at the angularity required to reflect the image of the index mark along the scanning axis of the cell. Arranged upon the exit side of the mill is another prism or mirror 53, carried upon a revoluble support 54, which is adapted to revolve with respect to a stationary mounting 55. The mirror reflects the image of index marks 3' to a mirror or prism 56, which is at sufficient angularity to direct the image along the scanning axis of the cell 50, and, thence, to the sensitive element thereof.

So long as index marks at the approach and exit sides of the mill are reflected, simultaneously, upon the photoelectric cell 50, a status quo is maintained in the associated relay signal circuit (not shown). As soon as one of these marks moves beyond the reflective scanning range of the cell, an impulse is sent for the signal relay circuit to give an indication of this change in status. The revoluble and stationary supports of the mirror or prism 53 are provided with a scale 57 on which a pointer 58 may indicate the number of degrees the mirror 53 has been turned from its zero position. The zero position is when the primary component of the scanning axis, indicated at 58' in Figure 9, is in the vertical, and a multiple of the distance $a$ from the center line C of the rolls, and from the vertical component 59 of the stationary scanning system at the approach side of the rolls. Upon elongation of the material, the index marks 3' are spread further apart, requiring the revoluble support 54 to be revolved to maintain the simultaneous appearances of the index marks 3' in the mirrors 51 and 53, respectively. The extent of the angular movement thus effected by the mirror 53 is readable upon the scale 57, which is calibrated in units of elongation.

The last embodiment, illustrated herein for giving effect to the principles of the invention, is that shown in Figures 7 and 8. In this case the strip is marked by some suitable device, indicated at 60, which may take the form of a lithographic roll having a fine screen marking pattern constituting the periphery thereof. An "inking" attachment 61 may be applied to replenish the marking compound upon the surface of the roll 60, which bears against the strip, with the aid of a backing up roll 4, to place a marking 62 of a predetermined light reflective and/or transmittive value. A light meter 63, which may be of the improved photoelectric cell type, is provided to scan the marking 62 at the exit side of the mill. This meter is provided with a scale calibrated in terms of units of elongation, the zero reading of which is determined by the response of the meter when scanning the marking 62 upon the approach side of the mill. This having been predetermined, the meter is correspondingly set-up on the exit side of the mill where it is caused to scan the marking upon the reduced strip. The marking will have become attenuated in direct proportion to the extent of the reduction afforded the strip by the work rolls 1. The difference in the reflected and/or transmitted light issuing from the attenuated marking, as compared with that of the marking on the unreduced strip, will be noted upon the scale of the light meter 63, or by a signal in an associated circuit (not shown), to give the amount of elongation which the strip has undergone.

The marking 62 may be achieved in one of two ways: (1) By placing an opaque substance upon the surface of the strip to impair the light reflectivity thereof, or, conversely, greatly to enhance the light reflectivity thereof; (2) By using a translucent material which is capable of modifying the light reflected through it from the surface of the strip. In the first of these examples, it is deemed desirable to use a printing roller having a surface comprised of very fine, closely spaced lines extending transversely of the strip so that there will be a rarefication of the optical density of the mark 62 after it has been attenuated incident to the elongation of the strip. In the second case, liquid suspensoid, or colloidal solution, having a substantial modifying effect upon the reflected light of the strip when transmitted therethrough, may be used at the approach side of the mill. Such a marking, even when placed in minute quantities, is thinned out by the ensuing reduction so as to give a different reflective light value at the exit side of the work rolls.

In the first of these examples the symmetrical and uniform placement of markings is critical, whereas in the second of these examples, the mass of the marking substance, particularly its thickness, is the controlling factor.

Obviously the markings may be made with finely pulverized powdered material, such as carbon (as an example of light absorptive material), or metals having a bright metallic lustre (as an example of the light reflective material). In all embodiments of the invention it is contemplated that the marks will be removed beyond the last indexing station, in view of which it will not be uneconomical to use noble metal powder, such as gold or platinum, for this latter function, since it would be, in the main, recovered.

As a modification of the last described embodiment of the invention, it will be appreciated that a light meter may be disposed to scan the marking on the strip upon the approach side of the mill so as to afford a differential reading in conjunction with the light meter at the exit side of the mill already described.

All of the foregoing arrangements are to be considered as examples without limitation admitting of any modifications and transposition of parts without departing from the spirit of the invention. For instance, it is contemplated that any suitable index marking devices may be provided, including the impressing of index marks upon material during some operation previous to the reduction operation, wherein the measurements are taken in accordance herewith. It will be obvious that the reciprocatory type of marker illustrated in Figure 6, and the rotary type of markers shown in the other figures, may be applied interchangeably. Similarly, the stationary contact 39 of Figure 6 may be disposed upon the approach side of the work rolls in an amount corresponding to the placement of photo cells shown in Figures 2 and 3.

It will also be appreciated that in any type of work wherein perforation of the work-piece is admissible, such perforations may be applied in lieu of the superficial index markings hereinbefore described. In such case, a light source would be disposed upon the side of the work opposite to that from which the photo cells are disposed in order that the latter may be actuated by light transmitted through the perforation. Perforations or struck-out portions could likewise be adopted to advantage in the electrical contact modification of the invention illustrated in Figure 6.

It has been previously explained in connection with Figures 4 and 6 that, through the electronic circuit acting in response to the condition of the strip being rolled, the relay R is actuated to move the associated switch to connect the power lead L to one of the two leads, $L_1$ and $L_2$. The circuits associated with leads $L_1$ and $L_2$ may control signal devices, respectively, so that, not only the fact of departure from gauge would be indicated thereby, but the direction of the departure as well; i. e., too much reduction when the circuit of lead $L_1$ is energized, or not enough reduction when lead $L_2$ is contacted.

Where manual manipulation of the mill controls is desired, the foregoing signal arrangement is all that will be required. It is frequently desirable, however, that where great quantities of strip of uniform gauge are to be produced, to set the mill and to provide for the automatic control thereof to insure against the production of off-gauge material. This may be done in one of two ways; either by controlling the compression to which the strip is subjected by controlling the screwdown setting of the mill, or by varying the tension of the strip being rolled. Of course, both of these corrections may be applied simultaneously. In the preferred embodiment of the present invention, control of either, or both, the compression and tension, is effected automatically by the measuring instrumentalities, hereinbefore described, to insure the continuous production of uniformly sized strip. The manner and means whereby this is accomplished is illustrated in Figures 10, 11 and 12 now to be described.

In Figure 10 there is shown in isometric view, a rolling mill having work rolls 1 through which the strip S, undergoing reduction, is fed in the direction of the arrows. For sake of completeness, there has been shown in this figure the photo-electric cell circuit diagram, as shown in Figure 4, including the cells 5 and 6, electronic tube T, and the relay R, which is actuated in response to the conditions of the strip being rolled to actuate the associated switch to connect power lead L with either of the contacts, $L_1$ and $L_2$, all as previously described.

The one manner of utilizing the actuation of this switch by the relay R so as to apply a correction to the screw-down setting of the mill, when such is indicated by the electronic measuring circuit, is shown in this figure. A ratchet wheel 101 is represented as being in driving engagement with a shaft 102, which is arranged to operate the screwdown mechanism 103 of the rolling mill M. The ratchet wheel is arranged to be revolved in either direction, in response to the condition in the strip being rolled, so as to effect an opening or closing of the mill to exert less or more compression, respectively, upon the strip so as to render correct the gauge of strip being produced.

One means for accomplishing this revolution of the ratchet wheel 101, as illustrated in Figure 10, comprises a walking beam 104, which, for convenience of illustration, has been shown in longitudinal sectional elevation. This walking beam is disposed to oscillate about an axis that is concentric with respect to the ratchet wheel 101, and is in free running relation to the shaft 102. Carried on the walking beam to each side of the ratchet wheel are pawl bearings 105, 105' upon which pawls 106, 106' are journaled for oscillatory movement. Extensions 107, 107' are connected with the pawls, respectively, so as to extend longitudinally of the walking beam to points of termination beyond the extremities of the latter. The pawl extensions are supported upon their underneath sides by bearings 108, 108', respectively, which are fixed to the walking beam, and the limits of their upward movements are fixed by bearings or stops 111, 111', respectively, likewise fixed to the walking beam.

Each of the pawl extensions is connected by a spring 109, 109', respectively, to some suitable adjacent stationary support lying beneath it, whereby, at equal tension, such springs serve to keep the pawl extensions bearing against the lower stops 108, 108' and to keep the walking beam poised in horizontal equilibrium. In this position each pawl is out of engagement with the ratchet wheel.

Arranged above and sufficiently close to the outer extremities of the pawl extensions 107, 107' are electromagnets 110, 110', respectively, which, when energized, are adapted to raise their respective pawl extension upwardly into engagement with the fixed stops 111, 111' carried by the walking beam, which movement is, at the same time, effective in bringing the pawl 106 or 106' into engagement with the ratchet wheel 101. Continued energization of one of the electromagnets would continue to attract the pawl extension so as to cause the latter, by virtue of the bearing 111, 111', as the case may be, to lift the walking beam upwardly through the intervening distance remaining to be traversed between the electromagnet and pawl extension. This last movement, attended by the tipping of the walking beam, is accomplished with the pawl in engagement with the ratchet wheel, as previously mentioned, whereby the ratchet wheel 101 is moved correspondingly in a clockwise direction, if the electromagnet 110 and pawl 106 is the active side, or in a counter-clockwise direction, if the electromagnet 110' and pawl 106' is the active side.

Upon de-energization of the electromagnet, the pawl extension falls by gravity against the lower bearing on the walking beam, in which motion it is assisted by the spring 109, 109', as the case may be, which withdraws the associated pawl from engagement with the ratchet wheel and brings the walking beam back to the position of horizontal equilibrium.

The electromagnets 110, 110' are energized, alternatively, from power leads L, Lx, in response to the actuation of the relay R to move the switch associated therewith to close the circuit with either the lead $L_1$ or the lead $L_2$. Inasmuch as the actuation of the relay R is rendered intermittent in response to the passing index marks on the strip, as has been hereinbefore described in connection with Figures 4 and 6, the pawl and ratchet arrangement, in conjunction with the springs 109, 109' shown in this figure, is induced continuously to oscillate until the proper gauge setting has been attained, after which it is rendered inactive by the institution of electrical balance between the cells 5 and 6 incident to their simultaneous apprehension of index marks, as previously described.

In Figure 11 there is disclosed a means for effecting the correction in gauge, indicated necessary by the previously mentioned electronic circuit measuring device, by the control of the tension to which the strip undergoing reduction is subjected. In this figure, the measuring means has been omitted in order to simplify the illustration. It will be understood that the leads $L_1$ and $L_2$ stand in the same relation to the measuring means and the associated relay switch R as have been previously explained in connection with Figures 4, 6, and 10. In Figure 11, there are shown reducing rolls 1 through which strip S is moved in the direction of the arrow from a pay-off reel 120 to a take-up reel 121. The pay-off reel 120 is controlled by a generator 123 which may be adjusted to oppose the motor 124 used to drive the take-up reel 121. The power line represented by the leads 125, 126 is arranged to serve both the generator and the motor.

The generator is provided with a series field 127, the excitation of which may be controlled by a variable resistor 128, and a shunt field 129, the excitation of which likewise may be controlled by the variable resistor 130, which is adapted to be automatically controlled in response to the actuation of the relay R (not shown in this figure), in closing either the circuit of lead $L_1$ or the circuit of lead $L_2$.

The motor 124 is provided with a series field 131, and a shunt field 132, the excitation of which is controlled by any suitable means represented by the variable resistor 133.

In order to provide more or less extension, the tension to which the strip is subjected must be increased or decreased, respectively, and in the foregoing embodiment this is accomplished by controlling the operation of the pay-off reel 120 by increasing or decreasing its resistance to the forwarding pull exerted by the motor 124 of the take-up reel 121. As has been previously mentioned, the shunt field of the generator 123 is used to impose more or less resistance to the turning of the generator 123 by the pay-off reel 120. Such control is rendered automatically responsive to conditions of the strip by rendering the shunt field variable resistor 130 responsive to the electrical conditions of solenoids 134 and 135, which are alternatively energized, depending upon whether the lead $L_1$ or the lead $L_2$ is contacted as a result of the operation of the relay R, as previously described. Each of solenoids 134 and 135 has its circuit completed through the common lead Lx as shown in this figure.

Let it be assumed that not enough reduction is being imparted to the strip S for reasons already set forth, the lead $L_2$ will be placed in circuit by actuation of the control relay R, thus to energize the solenoid 134 and cause the latter to be drawn leftwardly, as shown in Figure 11, thereby to move the variable resistor 130 to decrease the resistance of the shunt field windings 129 of the generator 123. This results in an augmentation of the field strength of the generator which, in turn, imposes a greater resistance to the turning of the pay-off reel 120 by the motor 124 of the take-up reel 121, thus subjecting the strip S to greater tensile pull, and effecting a greater amount of reduction.

If the correction indicated is to adjust for too much reduction, then the lead $L_1$ would be contacted by the relay R so as to energize the solenoid 135, causing the armature to move rightwardly as shown in Figure 11, and moving the movable element of the resistor 130 correspondingly. This would increase the resistance of the field winding 129 of the generator so as to diminish the excitation thereof. The rotor of the generator would then revolve more freely resulting in the strips being paid off from the pay-off reel 121 under less tension, thus to diminish the amount of reduction imparted to the strip.

Even though the actuation of the relay R be intermittent, only one surge of current afforded by the closing of either of the contacts L1 or L2 will be needed to dispose the armatures of the solenoids 134, 135, as the case may be, into position proper for the new tension setting, since no springs are applied to the armatures to return them to the previous neutral setting. If, however, the conditions of correction tend to become excessive, the solenoid opposite to that previously energized will become effective to return its armature, as well as the armature of the other solenoid, in an opposite direction, since it is contemplated that both armatures will be connected as at 136 into a unitary body having but a single movement. It will be understood that the action of the solenoids in attracting the armatures are thus applied in opposition, so that the solenoid 134 is effective in moving the armature assembly leftwardly as viewed in Figure 11, while the solenoid 135 is effective in moving the same rightwardly. Ordinarily, the setting of the manually controlled field resistor 128 and 133 of the generator and motor, respectively, will be such as to provide the estimated tension conditions, so as to leave the armatures of the solenoid 134 and 135, and the associated movable element of the variable resistor 130, in relatively neutral condition. It is only when the conditions of reduction exceed those initially contemplated, therefore, that the resistance 130 is automatically varied to effect the correction in the manner described.

It will be apreciated that the foregoing correction could be applied by setting the generator to exert a resistance to the pay-off provident of a unit tension in the strip, and that the motor could be controlled to vary the rate of take-up by the automatic instrumentalities explained in reference to the generator of Figure 11. In the interest of completeness, this has been shown in Figure 12, together with a diagram of how the compressive force regulating means shown in Figure 10 can be applied in connection with tension control simultaneously. It will, of course, be understood that the control of the tension thereof, shown as applied to the pull-out motor in Figure 12, could be applied with equal effectiveness to the pay-off generator, as is already described in conjunction with Figure 11.

In Figure 12, which has been drawn diagrammatically to inclue photo-electric measuring circuits, including the cells 5 and 6, the electronic tube T, and relay R, the tension of the strip is controlled by a generator 123 acting on the pay-off reel 120, and the motor 124 acting on a take-up reel 121. In this case, it is the motor that is automatically controlled to provide the necessary tension. This is accomplished by a variable resistor 133' disposed in the shunt field windings 132' for varying the excitation of the latter, thus to control the torque-speed of the take-up reel 121. The series field 131 is provided for the motor, to which power is applied by lines 125 and 126.

The generator 123 is equipped with a shunt field 129, the excitation of which is controlled by a manually adjustable variable resistor 130', and a series winding 127. The regulation of the motor is in relation to the resistance offered by the generator 123 (as applied to the pay-off reel 120) which resistance may be adjusted to the proper setting by the variable resistor 130'.

The means adopted automatically to vary the shunt resistance 133' of the motor 124 is similar to that previously described in Figure 11. A pair of solenoids 134, 135 are respectively disposed to act alternately upon armatures, connected together as at 136, to which latter is fastened the movable element of the variable resistor 133'. The circuit of the solenoid 134 is closed at one side by direct contact with the lead Lx, and at the other side by contact with the power lead L, through the relay switch, and contact L2. The solenoid 135 is energized through the power lead Lx when the power lead L is placed in closed circuit relation with the contact L1.

When the distance between adjacent index markings on the strip being rolled indicates, through the photo-electrical measuring instrumentalities shown in this figure, or through the mechanical-electrical combination of Figure 6 (which is equally applicable) that too much reduction is being effected, the relay closes the circuit of the solenoid 135 by connecting the contact L1 with the power lead L. This causes the armature to draw upwardly, as viewed in Figure 12, moving the movable element of the variable resistor 133' accordingly to increase the resistance of the shunt winding 132' of the motor 124. In this manner is the applied torque-speed item to the take-up reel 121 diminished. This, in relation to the unit pay-off conditions of the pay-off reel 120, as provided by the generator 123, causes a diminution in the tension of the strip being rolled with a corresponding correction in gauge.

If the condition of the strip being reduced is such that not enough reduction is being imparted, the reverse actuation is effected in that the relay R connects the power lead L with the contact L2 so as to place the solenoid 134 in circuit, moving the armature assembly and the associated movable element of the resistance 129' downwardly, as applied in Figure 12. This lessens the resistance in the shunt winding 132' of the motor 124 increasing the excitation thereof, and provides a greater torque-speed item at the take-up reel 121. This, in relation to the unit conditions of pay-off established at the pay-off reel 120 by the generator 123, effects an increase in the tension imparted to the strip being reduced so as to correct the gauge accordingly.

Now, as has been shown in Figure 12, the relay R in closing either of the leads L1 and L2 by actuation of the switch, in addition to correcting the tension setting as just described, may simultaneously be energizing the pawl and ratchet screwdown mechanism, shown in detail in Figure 10, and previously described herein. In this manner, a simultaneous correction of both compression and tension is applied to the metal being reduced so as to attain correct gauge setting with great accuracy and dispatch. Further elaboration on this combined function is not deemed necessary in view of the complete individual descriptions afforded for the preceding figures in the drawings.

It will be understood, therefore, that many modifications of the invention may be made without departing from the scope thereof, and it is not intended that we be limited to the specific

We claim:

1. The method of determining the extension effected in long bodies during the reduction thereof which includes, establishing a unit of measurement lengthwise of such a body prior to its reduction, and measuring the increase in length of said unit after reduction, while the reducing operation is in progress.

2. The method of determining the extension effected in long bodies during the reduction thereof which includes, indexing the unreduced body in predetermined spatial relation; subjecting the indexed body to mechanical working to reduce its cross-sectional dimensions, and, while the latter operation is progressing, measuring the amount of extension of the reduced body by comparing the spatial relation of the indexing on the reduced body with that of the initial indexing.

3. The method of determining the extension effected in long bodies during the reduction thereof which includes indexing the unreduced body; subjecting said body to mechanical working to reduce its cross-sectional dimensions, and measuring the extension therein by gauging the distance between indices on the reduced body with reference to a point of fixed datum during the reducing operation.

4. The method of determining the extension effected in long bodies during the reduction thereof which includes establishing index points in the relatively unreduced body; subjecting said body to mechanical working to reduce its cross-sectional dimensions, and measuring the extension therein by gauging the distance between an index point on the reduced body and an index point on the unreduced body.

5. The method of determining the extension effected in long bodies during the reduction thereof which includes, establishing index points on the relatively unreduced body; subjecting said body to mechanical working to reduce its cross-sectional dimensions, and measuring the extension therein by measuring the distance between an index point on the reduced body and a fixed point of reference simultaneously with the establishment of an index point on the unreduced body.

6. The method of determining the extension effected in long bodies during the reduction thereof which includes, establishing points of reference along the relatively unreduced body; elongating said body, actuating a measuring instrumentality by the points of reference along the reduced portions of said body, and automatically controlling the extent of elongation of the body in response to the actuation of said measuring instrumentality.

7. The method of determining the extension effected in long bodies during the reduction thereof which includes, establishing index marks in known relation on the body before reduction; reducing said body, and measuring the extent of reduction by photometrically gauging the extension of said body with reference to said index marks.

8. The method of determining the extension effected in long bodies during the reduction thereof which includes, establishing electrically insulative index marks on the body a unit distance apart before reduction; reducing said body; measuring the extent of reduction by electrically contacting said body in the path of said insulative marks upon the reduced portions thereof said unit distance from a point of fixed datum; and moving the point of electrical contact with reference to the point of fixed datum until the extension of said body is gauged.

9. The method of determining the extension effected in long bodies during the reduction thereof which includes, applying marking material to the body before reduction; reducing said body by mechanical working, and measuring the extension thereof by comparing the light responsive characteristics of the attenuated marking on the reduced portions of the body with the light-responsive characteristics of the non-attenuated marking on the unreduced portions thereof.

10. Extensometry, as applied in the reduction of metal bodies, which includes establishing index stations lengthwise of a work-piece before a reduction thereof; reducing the work-piece, and controlling the extension of the work-piece resulting therefrom by accurately determining the augmented distance between index stations, and applying the determination to establish and/or maintain the desired amount of extension.

11. Extensometry, as applied in the reduction of metal bodies, which includes establishing index stations lengthwise of a work-piece before reduction thereof a unit of length apart; reducing the work-piece, measuring the increase in distance between said index stations to determine the actual extension in said unit length, and automatically controlling the reducing operation to provide the desired extension in response to the measuring function.

12. In the rolling of strip and the like, the improvement which comprises rolling a strip; indexing the strip while being rolled; measuring the extension thereof by reference to the index marks relative to two data points; altering the spacing between said data points until a setting of ideal reduction is indicated; and adjusting the rolling mill in a corresponding manner until the ideal reduction is obtainable.

13. In the rolling of strip and the like, the improvement which comprises applying marking material to the strip and photometrically determining the actual increase per unit length of strip by comparison of the light-responsiveness of the marking material before and after the elongation thereof.

14. In combination with a rolling mill, a plurality of photoelectric cells; means for moving said cells relative to each other; indicator means variable in response to movement between said cells, and means carried by a work-piece passing through the mill for effecting the simultaneous activation of said cells in response to unit length conditions of said work-piece.

15. In combination with a rolling mill, means for modifying the light-reflective conditions upon a zone of one surface of a work-piece prior to passing through the mill, and means for measuring the elongation effected in said work-piece by gauging the light emitted from said zone after passing the mill.

16. In combination with a mill for reducing elongated bodies by applying tensile and compressive forces thereto, an extensometer for measuring the elongation per unit length imparted to such a body while it is undergoing reduction, and means cooperative with said extensometer for automatically controlling the application of at least one of said reducing forces, so as to establish and/or maintain the correct reducing condition.

17. Extensometry, as applied in the reduction of metal bodies, which includes indexing a moving work-piece after reduction by establishing indexing marks thereon a unit distance apart at a rate determined by the speed of travel of the work-piece before reduction, actuating measuring instrumentalities in response to said indexing upon reduced portions of the work-piece so that the rate of response of said instrumentalities is equal to the index-establishing rate, thus to gauge the increase in said unit distance between index marks, or a multiple thereof, incident to the extension of the work-piece.

18. Extensometry, as applied in the reduction of metal bodies, which includes establishing index stations lengthwise of a work-piece before a reduction thereof; subjecting the work-piece to mechanical working to reduce its cross-sectional dimensions; measuring the distance between the index stations on the elongated work-piece at two data points by moving one datum point relative to the other thereof to effect simultaneous apprehension of successive index stations, and thus to determine the extended dimension therebetween.

19. Apparatus of the kind described comprising a device for applying indexing markings on elongated bodies; means for automatically measuring the extension imparted to such body with reference to such indexing markings including a fixed measuring station and a movable measuring station; means for moving the latter station relative to the former, means associated with said stations for automatically announcing the attainment of spacing therebetween equal to the distance to be measured, and means associated with the movable station for indicating the amount of such distance in terms of extension imparted to said body.

ALLEN E. HIBSCHMAN.
WILLIAM J. KELLY.
PATRICK H. HUME.